United States Patent Office 3,519,597
Patented July 7, 1970

3,519,597
ADDUCTS OF HEXAHALOCYCLOPENTADIENE WITH ALKADIENES AS FIRE-RETARDANT ADDITIVES FOR POLYMERS
Edward D. Weil, Yonkers, N.Y., and John F. Porter, Durham, N.C., assignors to Hooker Chemical Corporation, Niagara Falls, N.Y., a corporation of New York
No Drawing. Continuation-in-part of applications Ser. No. 345,066, Feb. 17, 1964, and Ser. No. 597,855, Nov. 30, 1966. This application Nov. 29, 1967, Ser. No. 686,704
Int. Cl. C08g 51/58; C08f 45/58; C09k 3/28
U.S. Cl. 260—45.75
10 Claims

ABSTRACT OF THE DISCLOSURE

Mono- and di- Diels-Alder adducts of hexahalocyclopentadiene with terminally double bonded alkadienes having 8 to 20 carbon atoms are useful as fire retardant additives in polymers.

---

This is a continuation-in-part of Ser. No. 345,066, filed Feb. 17, 1964, now abandoned, and Ser. No. 597,855, filed Nov. 30, 1966, now abandoned.

In accordance with the present invention, the novel halogenated bicyclic hydrocarbons, which are prepared by the Diels-Alder reaction of hexahalocyclopentadiene and appropriate terminally unsaturated alkadienes, as will be more fully described hereinafter, are represented by the following formulas:

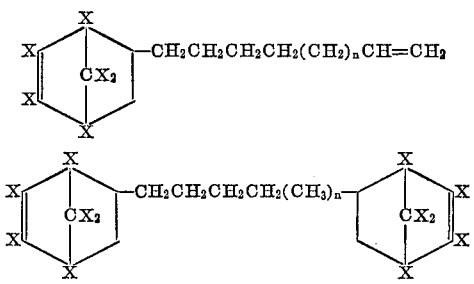

wherein X is a halogen atom such as chlorine or bromine, said halogen atoms being the same or different and $n$ is a number from zero to about 12.

Among the compounds within the present invention are the 1:1 and 1:2 adducts of 1,7-octadiene and longer chain terminal diolefins containing from 8 to about 20 carbon atoms and preferably from 8 to about 16 carbon atoms, such as 1,9-decadiene, 1,11-dodecadiene, 1,15-hexadecadiene and 1,19-eicosadiene (hereinafter called $\alpha,\alpha$-alkadienes) with hexachlorocyclopentadiene, hexabromocyclopentadiene, bromopentachlorocyclopentadiene, dibromotetrachlorocyclopentadiene, tribromotrichlorocyclopentadiene, tetrabromodifluorocyclopentadiene, and pentabromochlorocyclopentadiene, and the like. The preferred species for reasons of ease of manufacture and activity are the 1:1 and 2:1 adducts of hexachlorocyclopentadiene with 1,7-octadiene.

Illustrative examples of some of the compounds embraced herein thus include those as represented by the following formulas, but the invention is not intended to be limited thereto.

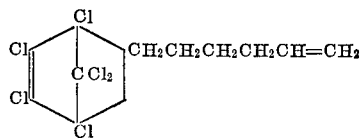

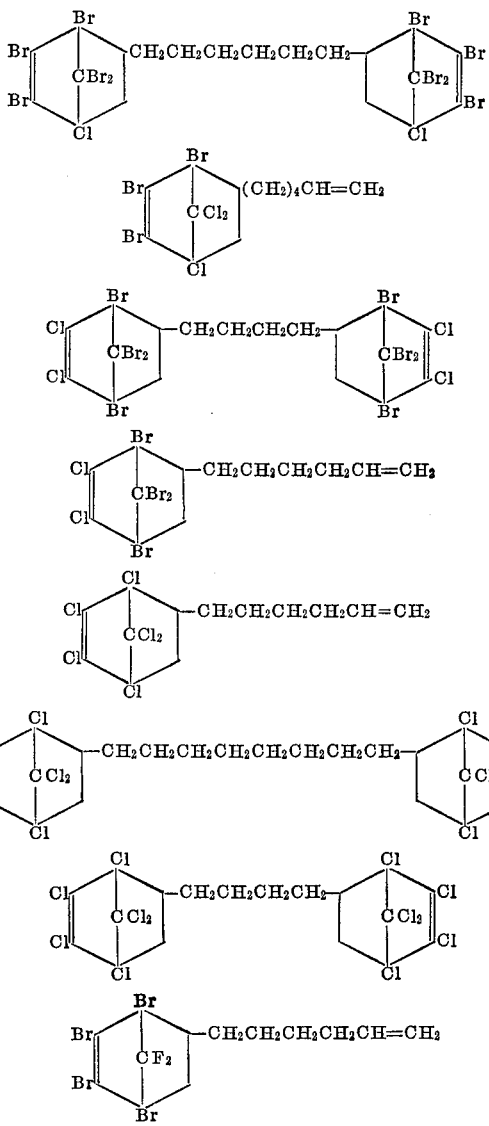

The 1:1 adducts and 2:1 adducts are prepared by the Diels-Alder reaction of hexahalocyclopentadiene, wherein the halogen atoms have an atomic weight between 34 and 81 with the appropriate diene, it being understood that the Diels-Alder diene synthesis comprises the 1,4 addition to a diene of an olefinic double bond.

The reaction is accomplished by heating together hexahalocyclopentadiene and the $\alpha,\alpha'$-alkadiene at a temperature from about 40 degrees centigrade to 250 degrees centigrade, and preferably at a temperature from 60 degrees centigrade to 200 degrees centigrade in the liquid phase, for a period of time ranging from 10 minutes near the higher temperature to about 10 days or more at the lower temperatures, the time being determined at any temperature by observing the exact conversion using distillation analysis, gas chromatography, infrared spectrum, change of refractive index, or any other convenient means to measure conversion.

The molar ratio of hexahalocyclopentadiene to $\alpha,\alpha'$-alkadiene will depend upon the product desired. Thus, if the 1:1 adduct is desired, one mole of hexahalocyclopentadiene to one mole or more of $\alpha,\alpha'$-alkadiene are utilized, while if the 2:1 adduct is desired, two moles or more of hexahalocyclopentadiene to one mole of $\alpha,\alpha'$-alkadiene are generally employed. At most ratios, at least some of each adduct is formed.

The 1:1 adducts, which are generally liquid, are best isolated and purified by distillation although other methods known in this art can be utilized. The 1:2 adducts, which are generally crystalline solids, are conveniently filtered out and, if desired, recrystallized. Further, both products can be made simultaneously, if desired, and are easily separated by separation methods known in this art, such as distillation, filtration or a combination of these methods.

The novel compounds of the present invention have utility as flame retardant additives to polymers. The 1:2 adduct possesses flame retardant properties when incorporated into resins. Specifically, the 1:2 adducts exemplified by the 1:2 Diels-Alder product of hexachlorocyclopentadiene with 1,7-octadiene possess remarkable flame retardant properties when incorporated into resins, as will be more fully illustrated in the working examples. They also possess unusual solubility in solvents, exhibit unexpected ability to be dispersed in polymers without substantial loss of other properties to the polymer, and yet have stability with respect to immigration from the polymer.

For flame-retardant purposes, the compositions comprising the novel compositions of the present invention can be admixed into the polymer by one of several methods known in this art. For example, the additives can be introduced into the polymer while the latter is dissolved in a suitable solvent. This procedure is especially useful when it is desired to mix the additives during the polymer manufacturing process. When the polymer is subsequently recovered from the solvent, the additives are intermittently mixed with the polymer. Usually, the additives are mixed with the polymer in the molten state at temperatures that can range from the melting point to a temperature just below the decomposition temperature of the polymer. Alternatively, the additives and polymer are dry blended in the finely divided state so that intimate mixture is obtained upon subsequent molding or extrusion.

Among the polymers in which the compounds of this invention are useful are the homopolymers and copolymers of unsaturated aliphatic, cycloaliphatic and aromatic hydrocarbons, such as polyethylene, polypropylene, polybutene, ethylene propylene copolymers, copolymers of ethylene or propylene with other olefins, polybutadiene, polymers of butadiene, polyisoprene, natural or synthetic, polystyrene, polyvinylidene, and polymers of pentene, hexane, heptane, octene, 2-methylpropene-1, 3-methylbutene-1, 4-methylpentene-1, 4-methylhexene-1, 5-methylhexene-1, bicyclohexene(2.2.1), pentadiene, hexadiene, 2,3-dimethylbutadiene-1,3, 2-methylpentadiene, vinylcyclohexene such as 4-vinylcyclohexene, cyclopentadiene, methylstyrene, and the like. Other useful polymers include indene-coumarone resins, polymers of acrylate esters and polymers of methacrylate esters, acrylate and methacrylate resins such as ethyl acrylate, n-butyl methacrylate, isobutyl methacrylate, ethyl methacrylate, and methyl methacrylate, alkyd resins, hydrocarbon resins from petroleum, isobutylene resins (polyisobutylene), isocyanate resins (polyurethanes), polyester resins such as polyesters (unsaturated) of dibasic acids and dihydroxy compounds, polyester elastomers, polyisobutylene, rubbers such as natural rubber, synthetic polyisoprene, chlorinated rubber, polybutadiene, cyclized rubber, butadiene-acrylonitrile rubber butadiene-styrene rubber, and butyl rubber, neoprene rubber (polychloroprene), styrene resins (polystyrene), terpene resins, urea resins, vinyl resins, such as poly(vinyl acetal), poly(vinyl acetate), vinyl alcohol-acetate copolymer, poly(vinyl alcohol), poly(vinyl alkyl ether), vinyl methyl ether-maleic anhydride copolymer, poly(vinyl chloride), poly(vinyl butyral), vinyl chloride-acetate copolymer, poly(vinyl pyrrolidone), and vinylidene chloride copolymer and the like.

Other polymers also within the scope of this invention include nylon, diallyl phthalates and phthalate resins, and polycarbonates. Polycarbonates are an especially useful type of thermoplastic polyester resin and are often formed from a dihydroxy compound and a carbonate diester. The more important commercial polycarbonates are made from para, para-isopropylidene-diphenol and phosgene. Other resins within the scope of this invention include the condensation reaction products of phenol and aldehyde, e.g., Novolacs and thermoplastic polymers of bis-(4-hydroxyphenyl)-2,2 - propane and epichlorohydrin (tradename of Phenoxy).

The fire retardant compounds of the instant invention are desirably incorporated into polymer materials in the range from about 5 to about 50 percent by weight of the polymer composition, and preferably from about 10 to about 35 percent by weight. An antimony compound, such as antimony oxide, can be used in amounts ranging from less than one to about 30 percent by weight of the polymer composition and preferably from 5 to about 20 percent by weight of the polymer composition to further enhance flame retardant properties.

The 1:1 adducts of the invention, having an unhindered olefinic double bond, can be polymerized and copolymerized, for example, with propylene and/or ethylene, using the catalysts known to the art for polymerizing propylene and ethylene. The polymers so produced have the advantage of possessing flame-retardant properties.

In the examples, specification and claims, parts are by weight and temperatures are in degrees centigrade, unless otherwise specified.

In order that those skilled in the art may better understand the present invention and the manner in which it may be practiced, the following illustrated examples are given.

EXAMPLE 1

Preparation of 1:1 and 2:1 adducts of hexachlorocyclopentadiene and octadiene-1,7

A mixture of 273 parts by weight of hexachlorocyclopentadiene and 55 parts by weight of octadiene-1,7 was heated on the steam bath for 2.5 days, then cooled to 25 degrees centigrade. The 2:1 adduct partly crystallized out and a sample was removed by filtration. The bulk of the reaction mixture was stripped under 0.1 mm. pressure to a pot temperature of 100 degrees, the distillate consisting of excess unreacted 1,7-octadiene and a small amount of unreacted hexachlorocyclopentadiene. The residue was dissolved in 600 parts of hot benzene, and the solution was cooled and filtered. The crystalline solids thus removed amounted to 155 parts of colorless 2:1 adduct, of the formula

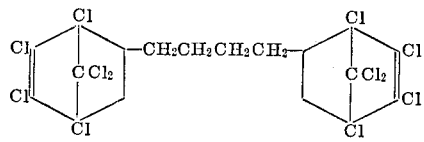

melting point 233 degrees centigrade. The infrared spectrum showed no —CH=CH$_2$ bands at 6.0–6.1$\mu$.

*Analysis.*—Calc'd for C$_{18}$H$_{14}$Cl$_{12}$ (percent): Cl, 64.9. Found (percent): Cl, 64.7.

The mother liquor was stripped free of benzene and distilled to obtain 40 parts of the 1:1 adduct

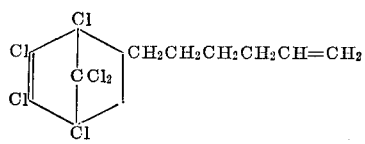

as a yellowish liquid distillate, boiling point 132–139 degrees (0.45 mm.). The infrared spectrum showed a CH=CH$_2$ group to be present.

*Analysis.*—Calc'd for C$_{13}$H$_{14}$Cl$_6$ (percent): Cl, 55.6. Found (percent): Cl, 55.7.

EXAMPLE 2

In a manner similar to Example 1 other hexahalocyclopentadienes and α,α'-alkadienes are reacted, as shown:

EXAMPLE 3

Use of 2:1 adduct of hexachlorocyclopentadiene and 1,7-octadiene as flame retardant additive for a resin

| Alkadiene (parts) | Hexahalocyclopentadiene | Temp., °C. | Time, hrs. | Products |
|---|---|---|---|---|
| 1,7-octadiene (50) | 5,5-dibromo-1,2,3,4-tetrachlorocyclopentadiene (300) | 100 | 48 | 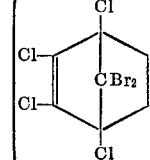 and 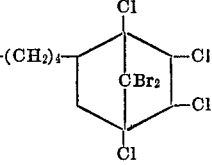 |
| 1,9-decadiene (50) | Hexachlorocyclopentadiene (300) | 120 | 10 | 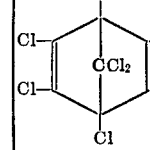 and 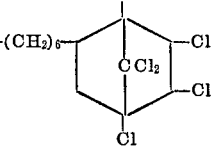 |
| 1,11-dodecadiene (50) | do | 140 | 5 | 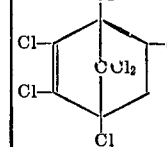 and 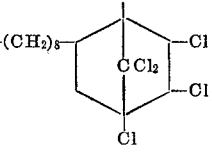 |
| 1,19-eicosadiene (50) | Hexachlorocyclopentadiene (300) | 160 | 1 | 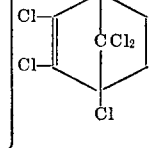 and 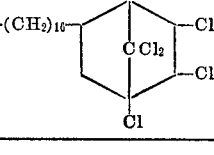 |

In Examples 3–5 the properties of the molded polymer compositions were tested in accordance with the standard American Society for Testing Material (ASTM) test procedures as follows:

A composition containing 55 percent polypropylene, 30 percent of the 2:1 adduct of hexachlorocyclopentadiene and 1,7-octadiene and 15 percent antimony oxide was blended in a ball mill overnight, extruded at 325 degrees Fahrenheit, chopped into prills, and injection molded at 350 degrees Fahrenheit into ⅛ x ½ x 5 inch bars. The material molded easily and the bars were pure white in color.

Flame retardance tests

An ASTM D-635-56T test was run on two of the bars described in the above paragraph. The results (outlined below) indicate that the composition is usefully fire resistant.

| Bar No.: | Burning time (seconds) after first ignition | Burning time after second ignition | Length burned, inch |
|---|---|---|---|
| 1 | 2.2 | 3.4 | 1⅛ |
| 1 | 0.9 | 3.3 | 1 1/16 |
| 2 | 4.2 | 3.5 | 1 |
| 2 | 1.9 | 1.0 | 1 5/16 |
| 2 | 1.3 | 1.0 | 1 |

The test samples did not drip during ignition or burning. A modified* fire retardence test, run on compressioin

*A modified ASTM 635 test utilizing compression molding and a rod 9 millimeters in diameter.

molded cylinders 9 millimeters in diameter, indicated that the presence of 25 percent of the 2:1 adduct of hexachlorocyclopentadiene and 1,7-octadiene also produces a very effective fire-retardant composition. Of course, lesser proportions of the adduct are also useful in reducing the flammability of resins and plastics. Test results are given below:

| | | |
|---|---|---|
| Percent polypropylene | 55 | 62.5 |
| Percent 2:1 adduct of hexachlorocyclopentadiene and 1,7-octadiene | 30 | 25 |
| Percent antimony oxide | 15 | 12.5 |
| Burning times (seconds) | 4.4 | 13.2 |

EXAMPLE 4

Effect on mechanical properties of 2:1 hexachlorocyclopentadiene and 1,7-octadiene adduct Several mechanical property tests were run on injection-molded bars of a composition containing 55 percent polypropylene, 30 percent 1,7-octadiene hexachlorocyclopentadiene adduct and 15 percent antimony oxide. The results are shown in the next table. For comparison, data for pure polypropylene also are given. The heat distortion point of the mixture was found to be 11.5 degrees centigrade higher than that of pure polypropylene.

| | Mixture | Pure polypropylene |
|---|---|---|
| Heat distortion point at 66° C. (lbs. per sq. inch) | 122 | 110 |
| | | 111 |
| Average | | 110.5 |
| Shore D hardness | 75.6 | 73 |
| Flexural yield strength (lbs. per sq. inch) | 6,960 | 8,320 |
| Flex modulus (lbs. per sq. inch) | 3.22×10⁵ | |
| | 3.22×10⁵ | |
| | 2.91×10⁵ | |
| | 2.76×10⁵ | |
| | 2.96×10⁵ | |
| Average | 3.01×10⁵ | 2.77×10⁵ |

EXAMPLE 5

Comparison of heat aging behavior of resin containing 2:1 hexachlorocyclopentadiene 1,7-octadiene adduct The following compositions were intimately blended and then were molded into ⅛" x ½" x 5" test bars:

(1) 30% of the 2:1 $C_5Cl_6$/1,7-octadiene adduct
   15% $Sb_2O_3$
   55% polypropylene
(2) 25% 2:1 $C_5Cl_6$/butadiene adduct
   12½% $Sb_2O_3$
   62½% polypropylene The bars were then heated at 120 degrees centigrade in an air-circulating oven and the percent weight loss determined at various intervals. The results were as follows:

| Composition | Weight Loss at Number of Days Indicated | | | |
|---|---|---|---|---|
| | 4 | 8 | 12 | 46 |
| (1), percent | 0.3 | 0.3 | 0.5 | 1.0 |
| (2), percent | 5.4 | 12.8 | 20.8 | |

The bars of composition 2 after a short time, developed a cracked spongy appearance, became brittle, and broke into small pieces at 12 days, causing their removal from the test.

The bars of composition (1) retained substantially their original appearance and properties.

When tested in accordance with the above procedures the hexabromocyclopentadiene 1,9-decadiene adduct is found to have similar priperties.

Pencil rod molding compositions weighing about 5 grams were prepared from 10 gram mixtures of the compositions whose proportions are given below. A modified ASTM D-635-56T flammability test was run on each pencil rod and the results are shown in Table 1 below.

TABLE I

| Example: | Composition | Weight Percent | Flammability |
|---|---|---|---|
| 6 | Polystyrene | 80 | Self-extinguishing in an average of 2 seconds. |
| | 2:1 diadduct of hexachlorocyclopentadiene and 1,7-octadiene. | 13.3 | |
| | Antimony oxychloride | 6.7 | |
| 7 | Polystyrene | 60 | Self-extinguishing in an average of 3 seconds. |
| | 2:1 diadduct of hexach orocyclopentadiene and 1,7-octadiene. | 40 | |
| 8 | Polystyrene | 60 | Non-burning |
| | Antimony oxychloride | 40 | |
| 9 | Polystyrene | 80 | Self-extinguishing in an average of 10 seconds. |
| | 2:1 diadduct of hexachlorocyclopentadiene and 1,7-octadiene. | 13.3 | |
| | Antimony oxide | 7.6 | |

EXAMPLE 10

Migration tests

Pencil rod molding compositions were prepared from 10 gram mixtures of 55% by weight polypropylene, 35% by weight of the candidate adduct and 10% by weight antimony oxide. The resultant polyproplyene compositions were dry blended in a Wiley mill and charged into 7 millimeter (Internal Diameter) glass tubes.

Pencil rod moldings were prepared from these compositions by heating them under pressure in a molten salt bath.

Duplicate pencil rods for each adduct were heat aged for 90 days at 120° C. Weight losses, calculated as percent of adduct present in the unaged pencil rods are tabulated in Table II.

TABLE II.—MIGRATION STUDIES: POLYPROPYLENE FILLED WITH $Sb_2O_3$ AND C-56 DIADDUCTS

[Percent diadduct loss]

| Days at 120° C. | 2/1 C-56-Butadiene | DC | 2/1 C-56-OD | 2/1 C-56-COD | 2/1 C-56-CPD |
|---|---|---|---|---|---|
| 1 | 3.56 | 6.46 | 0.31 | 0.28 | 0.42 |
| 4 | 8.72 | 12.9 | 0.55 | 0.45 | 0.71 |
| 7 | 12.5 | 17.1 | 0.71 | 0.55 | 0.97 |
| 14 | 20.0 | 25.5 | 0.96 | 0.59 | 1.39 |
| 21 | 27.1 | 33.1 | 1.31 | 0.72 | 1.92 |
| 35 | 36.2 | 43.1 | 1.71 | 0.78 | 2.66 |
| 42 | 39.8 | 47.3 | 1.99 | 0.82 | 3.05 |
| 56 | 47.8 | 56.3 | 2.69 | 1.02 | 4.12 |
| 70 | 53.3 | 63.1 | 3.41 | 1.22 | 5.16 |
| 84 | 58.1 | 68.9 | 3.82 | 1.25 | 5.97 |
| 91 | 59.0 | 71.2 | 4.01 | 1.29 | 6.35 |

CPD = cyclopentadiene.
OD = 1,7-octadiene.
COD = 1,5-cyclooctadiene.
DC = Reaction product of hexachlorocyclopentadiene with itself in the presence of $AlCl_3$.

EXAMPLE 11

Vapor pressure tests

Samples of each compound identified below were heated in a glass tube at 197° C. while nitrogen was slowly passed over the sample. The vaporized compound was collected in a cold trap and weighed. Vapor pressure was calculated from the weight of material collected per day. The results are shown in Table III.

TABLE III

Vapor pressures of C-56 diadducts at 197° C.

| Diadduct: | Millimeters of mercury |
| --- | --- |
| 2:1 C-56+1,7-octadiene | 0.021 |
| 2:1 C-56+1,5-cyclooctadiene | 0.006 |
| 2:1 C-56+butadiene | 0.494 |
| DC | 0.273 |

EXAMPLE 12

Solubility in solvents

Mineral spirits (100 grams) and the candidate diadduct (10 grams) were weighed into a 250 milliliter Erlenmeyer flask. The mixture was refluxed for 15 minutes and filtered hot. The solubility was calculated from the weight of the residue in the filter paper. This is shown in Table IV.

TABLE IV

Solubility of C-56 diadducts in mineral spirits

| Diadducts: | g./100 g. mineral spirits at B.P. |
| --- | --- |
| 2:1 C-56+1,7-octadiene | 9.5 |
| 2:1 C-56+1,5-cyclooctadiene | 5.7 |
| 2:1 C-56+butadiene | >10 |
| DC | >10 |

EXAMPLE 13

Dispersion in plastics

The molded pencil rod compositions described in Example 11 above were examined for dispersion of the diadduct in the polypropylene. The particle size of the diadduct to be compounded in the polypropylene was approximately the same in each case. The 2/1 C-56 diadduct with 1,7-octadiene was much more fully dispersed than the C-56 diadduct with 1,5-cyclooctadiene, and was dispersed about the same as the others listed in Table II.

EXAMPLE 14

Flammability

Pencil rod compositions were prepared as in Example 11 above, using 55% by weight of polypropylene and 45% by weight of the diadduct shown below. An ASTM D-635-56T test was run on each pencil rod, the results are shown in Table V.

TABLE V.—FLAMMABILITY OF C-56 DIADDUCTS

| Diadduct | Burning time (seconds) after first ignition | Burning time (sec.) after 2nd ignition |
| --- | --- | --- |
| 2/1 C-56-1,7-octadiene | 40 | 33 |
| 2/1 C-56-butadiene | 18 | 27 |

EXAMPLE 15

Pencil rod molding compositions were prepared from 10 gram mixtures of 85% by weight Phenoxy resin (a polyether prepared from epichlorohydrin and bisphenol-A), 10% by weight of the 2:1 diadduct of hexachlorocyclopentadiene and 1,7-octadiene, and 5% by weight antimony oxide. The compositions were self-extinguishing in an average of two seconds with no dripping.

While there have been described various embodiments of the invention, the methods and elements described are not intended to be understood as limiting the scope of the invention. It is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A fire retardant polymer composition comprising (1) a polymer of an ethylenically unsaturated hydrocarbon, and (2) between about 5 and about 50 percent by weight of a compound as represented by the formula:

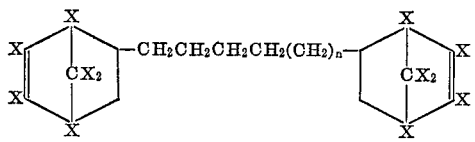

wherein X is a halogen atom selected from the group consisting of chlorine, fluorine and bromine and $n$ is from 0 to 12.

2. A composition according to claim 1 wherein the compound is:

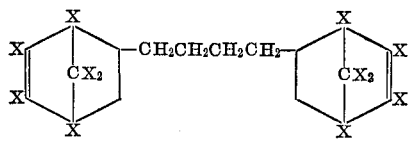

3. A composition according to claim 1 wherein the compound

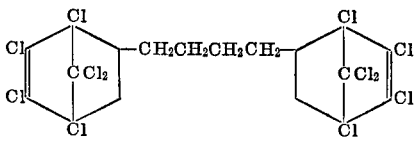

4. A composition according to claim 1 wherein the polymer is polyethylene.

5. A composition according to claim 1 wherein the polymer is polypropylene.

6. A composition according to claim 1 wherein the polymer is polystyrene.

7. A fire retardant polymer composition comprising (1) a polymer selected from the group consisting of a polymer of an ethylenically unsaturated hydrocarbon, a polyester, a synthetic polymeric amide which has recurring amide groups as an integral part of the main polymer chain, a thermoplastic polymer of bis-(4-hydroxyphenyl)-2,2-propane and epichlorohydrin, a diallyl phthalate resin and a Novolac resin, and (2) between about 5 and about 50, percent by weight of a compound as represented by the formula:

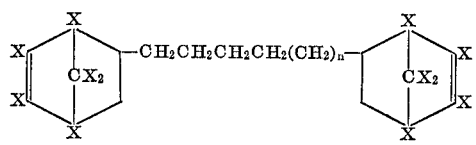

wherein X is a halogen atom selected from the group consisting of chlorine, fluorine and bromine and $n$ is from 0 to 12.

8. A fire retardant polymer composition comprising (1) a polymer selected from the group consisting of a polymer of an ethylenically unsaturated hydrocarbon, a polyester, a synthetic polymeric amide which has recurring amide groups as an integral part of the main polymer chain, a thermoplastic polymer of bis-(4-hydroxyphenyl)-2,2-propane and epichlorohydrin, a diallyl phthalate resin and a Novolac resin, and (2) between about 5 and about 50 percent by weight of a compound as represented by the formula:

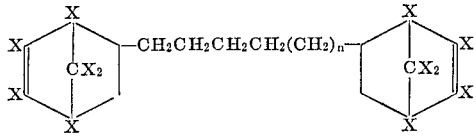

wherein X is a halogen atom selected from the group consisting of chlorine, fluorine and bromine and $n$ is from 0 to 12 and (3) from less than 1 to about 30 percent by weight of an antimony compound.

9. The fire retardant polymer composition of claim 8 wherein the antimony compound is antimony oxide.

10. A fire retardant polymer composition comprising (1) a polymer of an ethylenically unsaturated hydrocarbon and (2) between about 5 and about 50 percent by weight of a compound as represented by the formula:

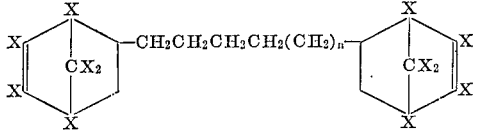

wherein X is a halogen atom selected from the group consisting of chlorine, fluorine and bromine and $n$ is from 0 to 12, and (3) from less than 1 to about 30 percent by weight of an antimony compound.

References Cited
UNITED STATES PATENTS 2,909,501  10/1959  Robitschek et al. ____ 260—45.75

DONALD E. CZAJA, Primary Examiner

V. P. HOKE, Assistant Examiner

U.S. Cl. X.R.

260—45.7